United States Patent Office 3,621,736
Patented Nov. 23, 1971

3,621,736
TURRET ASSEMBLIES
Frederic Reginald Stanley, Farnham, Surrey, England, assignor to H.C.F. (Turrets) Limited, London, England
Filed May 1, 1969, Ser. No. 821,561
Claims priority, application Great Britain, May 1, 1968, 20,663/68
Int. Cl. B23b 29/28
U.S. Cl. 78—824
11 Claims

ABSTRACT OF THE DISCLOSURE

This invention is a lathe turret assembly having self-retained locating balls for correctly positioning it and having a handle which can turn it through a pre-determined discrete angle when a different tool is to be used.

---

Figure 1:
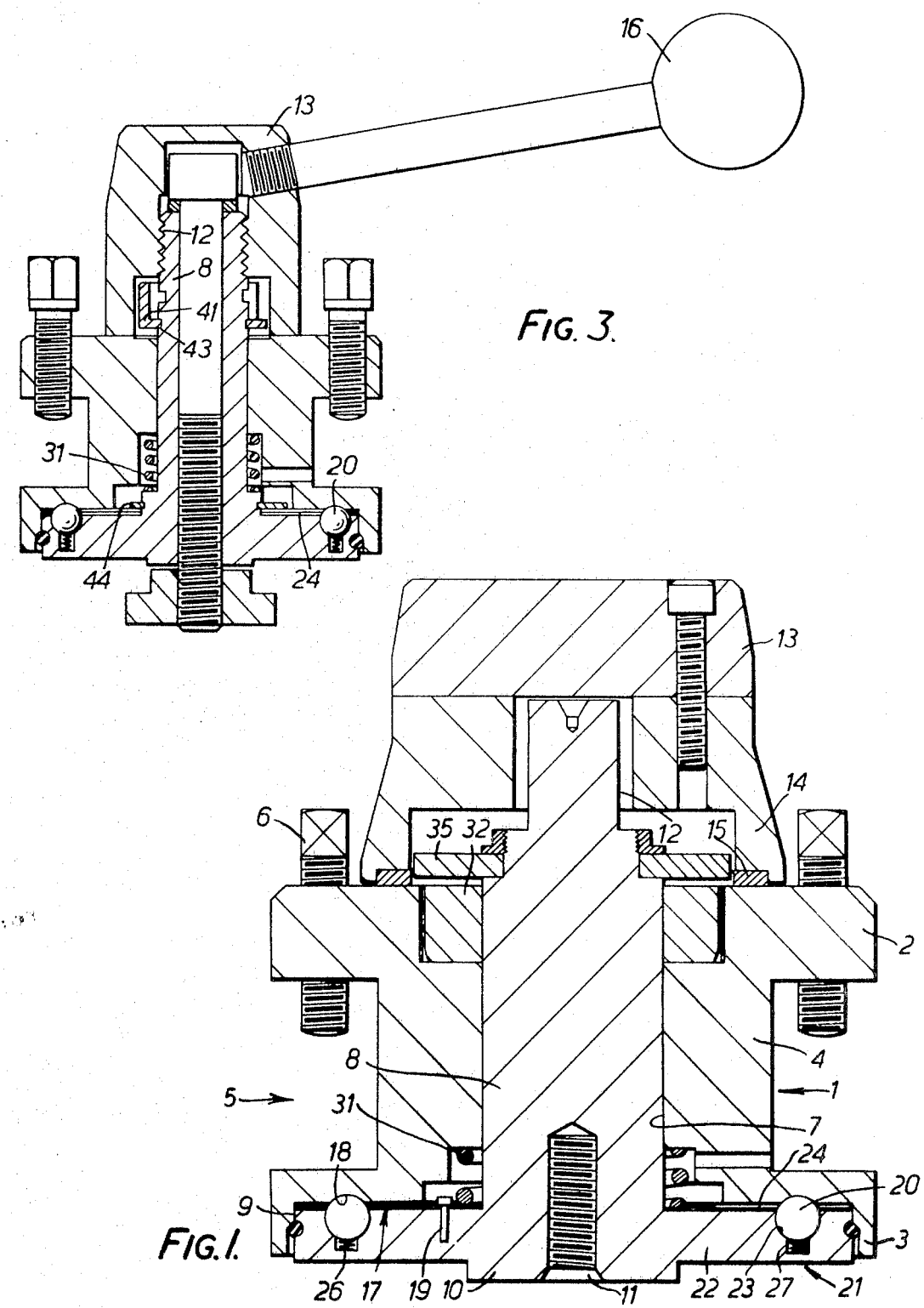

This invention relates to lathe turret assemblies.

According to the present invention a lathe turret assembly includes a turret block arranged to be located in any of a plurality of positions with respect to a reference member determined by at least one locating part on the reference member or block co-operating with one of a number of co-operating parts on the block or reference member and means for retaining the locating parts in position after the block has been removed from the reference member.

Preferably the locating part or parts (assumed hereafter to be parts) are in the form of balls in which case the reference member and the block may be provided with part-spherical recesses to receive the balls. In either case the balls may be retained in position on the reference member or block by means of a cage in the form of a plate having openings therein of lesser diameter than the balls through which the balls project, the balls thus being retained in position. The balls may be biassed against the plate by springs, and in a preferred construction the balls are retained in the reference member.

The reference member may be in the form of an annular body having a face or end which has a number of circumferentially spaced part-spherical recesses in which the balls are retained. In this case the turret block may be provided with a counter-bore in its lower surface in the face or end of which are a number of corresponding circumferentially spaced part-spherical recesses arranged to receive the balls.

With the present invention there is thus no danger of the balls becoming displaced or lost when the turret block is removed. In addition the turret block can be taken off and put away with all the tools in position and the next time a similar job of work is required on the lathe the same block can be refitted, the balls relocating the block in the correct position and the tools are thus automatically in their correct positions for the job.

According to another aspect of the invention a lathe turret assembly includes a turret block arranged to be located in any of a plurality of positions with respect to a reference member having locating means for determining the positions and a locking device for holding the block located including a manually removable release device for releasing the block from the locating means after the locking device has been unlocked or removed.

This invention also relates to a rotatable turret for holding tools in a machine tool and one object is to provide such a turret which precisely defines different positions of rotation into which the tools can be indexed without requiring excessive precision machining.

According to the present invention discrete angular turret positions are defined by balls or other locating parts in sets of seats, respectively in a fixed part and a rotatable part of the turret, and the turret includes a release member for releasing one set of seats from the balls to enable the rotatable part to be indexed, and drive means respectively on the rotatable part and the release member which interengage after the set of seats has been released from the balls to enable rotation or other further movement of the release member to effect rotation of the rotatable part through one step.

The release member is conveniently in the form of a nut having a handle enabling it to be released and tightened so that the operator can perform this operation on the nut and the turret will be automaticaly indexed through one step corresponding to the angle between adjacent discrete angular turret positions.

Thus, the drive means may be constituted by a set of ratchet teeth on the rotatable part and a pawl on the release member or vice versa.

Conveniently the releasable set of seats are in a member which is spring-biassed away from the balls when the nut is tightened.

Figure 2:
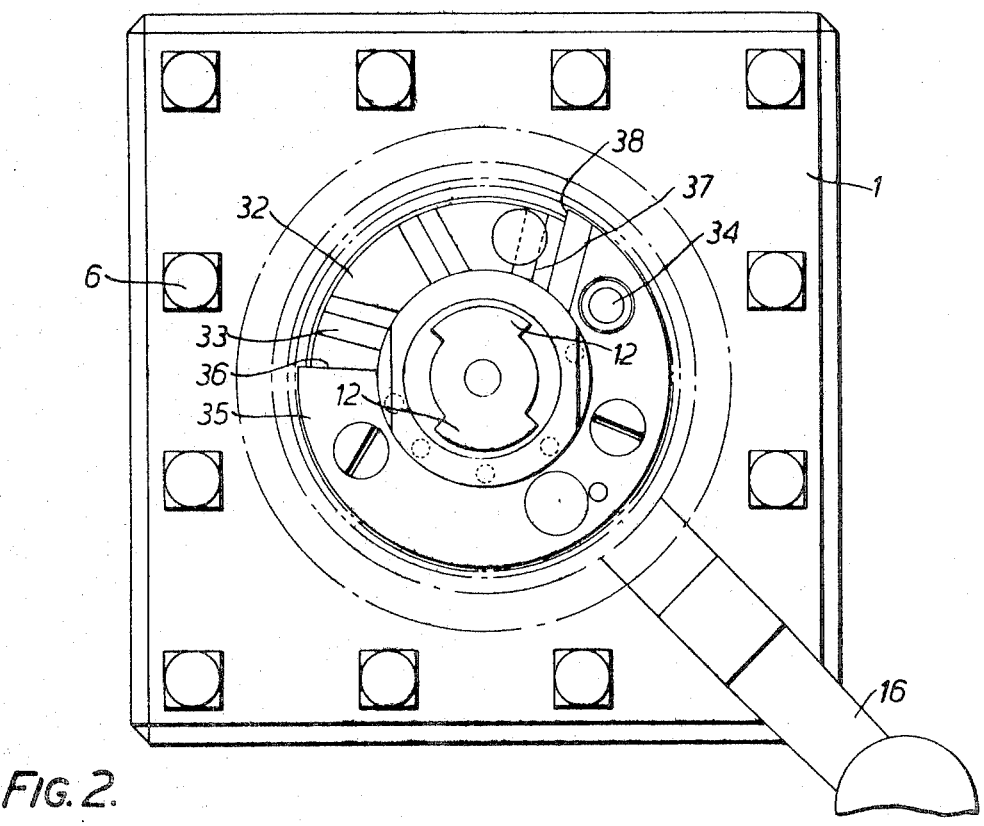

The invention may be carried into practice in vairous ways and one specific embodiment will now be described by way of example with reference to the accompanying drawings, in which:

FIG. 1 is a cross-sectional view through a lathe turret according to the invention, and FIG. 2 is a plan view, partly cut away, of the turret shown in FIG. 1.

As shown in FIG. 1 the lathe turret comprises a rectangularly shaped block or body indicated generally at 1 and comprising upper and lower body parts 2 and 3 respectively of substantially the same external dimensions, and an intermediate part 4 of smaller dimensions than the upper and lower body parts 1 and 2 so as to provide four recesses 5 in which tools may be secured by means of fixing screws 6.

The block 1 has extending through it a central bore 7 through which extends a stem 8 the lower end of which has a boss 10 arranged to be attached to the cross slide of a centre lathe and in which it can be secured by a bolt in a bolt hole 11. The upper end of the stem 8 carries a double-start quick pitch screw-thread 12 on which is mounted a clamping head 13 having an annular axially extending flange 14 on its underside arranged to engage, through a block protection washer 15, the top of the block 1. A handle 16 is connected to the clamping head 13 for rotating it.

The lower part 3 of the block 1 is provided with a counterbore 9 in its lower surface, the upper or end face 17 of which has a number of part-spherical circumferentially spaced recesses 18 in it arranged to receive balls 20 forming part of a reference assembly indicated generally at 21 on which the stem 8 is fixed. The assembly 21 has an annular body 22 whose upper surface has part-spherical recesses 23 in it corresponding in number and shape to the part-spherical recesses 18 and providing seats for the locating balls 20. Connected to the upper surface of the reference assembly by means of screws 19 is an annular plate 24 having openings in it corresponding to the recesses in the parts 3 and 22. The openings in the plate are of lesser diameter than the diameter of the balls 20 so that they retain the balls 20 in the recesses 23. The balls are biassed upwardly, by means of compression springs 26 underneath them in recesses 27, to abut against the plate 24 so that their upper parts project through the openings in the plate 24. The reference member 22 has a key, not shown, in its lower surface, for engagement with a keyway in the lathe so as to restrain it from rotational movement.

Thus, the turret block or body can be removed, either for cleaning or replacement with another, and there is no risk of the balls becoming dislodged or lost. Also the turret block can be put away with all the tools in position and next time a similar job of work is required on the lathe, the block can simply be refitted over the reference assembly and the balls in the reference assembly will automatically reset the tools in their correct positions and hence a considerable amount of time is saved which would otherwise have to be spent in resetting the tools.

A strong compression spring 31 acts to bias the block 1 away from the reference assembly 21 so that the recesses 18 can be released from the balls 20, this movement is however, normally restrained by the cap 13 bearing through the washer 15 on top of the block 1.

The block 1 carries, and is keyed to, a ring 32 formed with a ring of ratchet teeth 33 in its upper surface. These can inter-engage with a downwardly spring biassed pawl 34 held eccentrically in the cap 13. However, in the position shown in FIG. 1 when the cap is screwed down to force the tool holder seats 18 into engagement with the balls 20, the pawl 34 is held up against its spring (not shown) by a plate 35 carried by the spindle 8. When the head is released and starts to move up the thread 12 the tool block 1 is pushed up by the spring 31 and carries the ratchet ring 32 upwards with it. At a certain angular position of the head the pawl 34 encounters a gap between edges 36 and 38 in the plate 32 and can be pushed by its spring into engagement with a ratchet tooth 37.

Thus, further rotational movement of the head 13 in relation to the stem 8 rotates the ratchet ring 32 around the stem and, as the ring 32 is keyed to the block 12, it rotates the block. The annular extent of the gap 36 is sufficient just to permit movement through one step and thereafter an inclined edge 38 of the gap lifts the pawl from the ratchet teeth.

Thereafter re-tightening of the head 13 locks the block in the new position of rotation. Of course, as it passes the gap 36 the pawl 34 rides over the back of a ratchet tooth without moving it.

Precise determination of the new position is provided by the balls 20 and the seats formed by the recesses 18 and it can be seen that this is provided without having to provide very precisely machined and hardened rotational bearing surfaces between the stem and the block 1. Moreover, the operator does not have to set the amount by which the block is indexed as it is automatically indexed through one step as defined by a ratchet tooth pitch each time he releases and re-tightens the nut.

A stop pin is also provided in the head 13 for engagement with a ball to absorb some of the kinetic energy of the block.

Figures 4, 5:
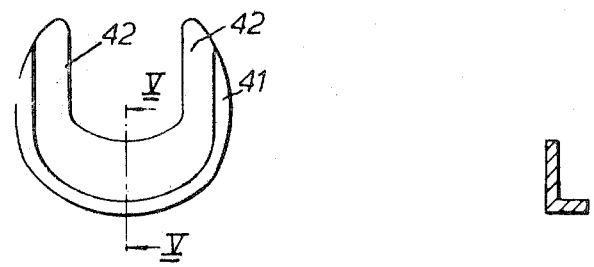

A further embodiment of the invention is shown in FIGS. 3, 4 and 5 of which FIG. 3 is a cross-section through what may be described as a quick change turret. FIGS. 4 and 5 are respectively a plan view and a section of the clip 41 on the line V—V of FIG. 4, but to an increased scale with respect to FIG. 3.

This turret is in many respects similar to the turret of FIGS. 1 and 2 and similar components have been given the same reference numerals.

However, the turret is not suitable for automatic indexing as provided by the ratchet ring 32 and indexing is effected by hand after the nut 13 has been released by the handle 16 sufficient to allow the block 1 to be pushed upwards by the spring 31 to be released from the balls 20. After indexing the block 1 can be relocked by tightening the handle 16.

If, however, the nut 13 is completely removed from the thread 12 which in this case is a single start thread of normal pitch the block 1 is only prevented from rising up the stem 8 by a clip 41 shown in detail in FIGS. 4 and 5 which has two internal flanges 42 which can enter a slot 43 in the stem 8. If the block 1 is pushed down against the spring 31 the clip 41 can be easily slid out of its slot 43 and then the block with its tools can be slid off the stem 8 and stored. A different block with different tools can be equally quickly fitted over the stem 8 so that a very quick change is achieved and as described above the cage constituted by the plate 24 prevents the balls 20 being ejected while the block is off the stem. In this embodiment the plate 24 is retained in position by way of a circlip 44.

What I claim as my invention and desire to secure by Letters Patent is:

1. A lathe turret assembly including a turret block arranged to be located in any of a plurality of positions with respect to a reference member determined by at least one locating ball on one of the reference member and block cooperating with one of a number of cooperating parts on one of the block and reference member and means arranged to retain the at least one locating ball in position after the block has been removed from the reference member and in which one of the reference member and the block is provided with recesses to locate on the balls.

2. A lathe turret as claimed in claim 1 in which the at least one ball is retained in the reference member.

3. A lathe turret as claimed in claim 1 in which the reference member is in the form of an annular body having a face which has a number of circumferentially spaced part-spherical recesses and a member of locating balls are retained therein.

4. A lathe turret as claimed in claim 3 in which the turret block is provided with a counterbore in its lower surface in the face or end of which are a number of corresponding circumferentially spaced part-spherical recesses arranged to locate on the balls.

5. A rotatable turret for holding tools in a machine tool, which turret precisely defines different positions of rotation into which the tools can be indexed the said discrete angular turret positions being defined by locating parts in sets of seats, respectively in a fixed part and a rotatable part of the turret, the turret including a release member in the form of a nut having a handle enabling it to be released and tightened for releasing one set of seats from the locating parts to enable the rotatable part to be indexed, and drive means respectively on the rotatable part and the release member which interengage after the set of seats has been released from the locating parts to enable further movement of the release member to effect rotation of the rotatable part through one step, the drive means being constituted by a set of ratchet teeth on one of he rotatable parts and the releaseable member and a pawl on the other of the rotatable parts and the releaseable member.

6. A turret as claimed in claim 5 in which the locating parts are constituted by balls.

7. A turret as claimed in claim 5 in which the nut is on a two-start quick pitch screw thread.

8. A turret as claimed in claim 5 including a guard between the pawl and the ratchet teeth but having a gap permitting the pawl to engage a ratchet tooth during he said further movement of the release member.

9. A lathe turret assembly including a turret block arranged to be located in any of plurality of positions with respect to a reference member having locating means for determining the positions and a locking device for holding the block located including a manually removable release device for releasing the block from the locating means after the locking device has been unlocked or removed, the release device being constituted by a one-piece clip.

10. A lathe turret assembly including a turret block arranged to be located in any of a plurality of positions with respect to a reference member determined by at least one locating ball on the reference member or block co-operating with one of a number of co-operating parts on the block or reference member and means arranged to retain the locating ball or balls in position after the block has been removed from the reference member, and in which the balls are retained in position on one of the reference members and the block by means of a cage in the form of a plate having openings therein of lesser diameter than the balls, through which the balls project.

11. A lathe turret as claimed in claim 10 in which the balls are biassed against the plate by springs.

References Cited

UNITED STATES PATENTS

| | | | |
|---|---|---|---|
| 2,527,871 | 10/1950 | Bakewell | 74—813 X |
| 2,531,198 | 11/1950 | Bruet et al. | 29—49 |
| 2,908,195 | 10/1959 | Benes | 74—826 X |
| 3,386,315 | 6/1968 | Aihara et al. | 74—813 |
| 3,422,710 | 1/1969 | Kilmer | 74—813 X |
| 3,461,525 | 8/1969 | Gourley | 29—35.5 |

FOREIGN PATENTS

| | | | |
|---|---|---|---|
| 527,215 | 10/1940 | Great Britain | 29—48.5 |

WILLIAM F. O'DEA, Primary Examiner

F. D. SHOEMAKER, Assistant Axaminer

U.S. Cl. X.R.

29—49; 74—826